United States Patent
Tyagi et al.

(10) Patent No.: US 9,153,964 B2
(45) Date of Patent: Oct. 6, 2015

(54) SYSTEMS AND METHODS TO AGGREGATE LOADS FOR DEMAND RESPONSE EVENTS

(75) Inventors: Rajesh Tyagi, Niskayuna, NY (US); Jason Wayne Black, Clifton Park, NY (US); Prasoon Tiwari, New Delhi (IN)

(73) Assignee: General Electric Company, Niskayuna, NY (US)

(*) Notice: Subject to any disclaimer, the term of this patent is extended or adjusted under 35 U.S.C. 154(b) by 800 days.

(21) Appl. No.: 13/228,609

(22) Filed: Sep. 9, 2011

(65) Prior Publication Data
US 2013/0066476 A1    Mar. 14, 2013

(51) Int. Cl.
G05D 3/12    (2006.01)
H02J 3/14    (2006.01)
H02J 3/00    (2006.01)
G06F 1/26    (2006.01)

(52) U.S. Cl.
CPC . *H02J 3/14* (2013.01); *H02J 3/008* (2013.01); *G06F 1/26* (2013.01); *Y02B 70/3225* (2013.01); *Y04S 20/222* (2013.01); *Y04S 50/10* (2013.01)

(58) Field of Classification Search
CPC ..... G06F 1/26; Y02B 70/3225; Y04S 20/222; Y04S 50/10
USPC .......................................... 700/291, 295, 296
See application file for complete search history.

(56) References Cited

U.S. PATENT DOCUMENTS

| 7,171,374 | B1 | 1/2007 | Sheehan et al. |
| 7,778,738 | B2* | 8/2010 | Taft ............................ 700/295 |
| 2005/0116836 | A1* | 6/2005 | Perry et al. ............... 340/870.02 |
| 2007/0135973 | A1* | 6/2007 | Petite ........................... 700/295 |
| 2009/0062970 | A1 | 3/2009 | Forbes, Jr. et al. |
| 2010/0211443 | A1 | 8/2010 | Carrel et al. |
| 2010/0241285 | A1 | 9/2010 | Johnson et al. |
| 2011/0066300 | A1 | 3/2011 | Tyagi et al. |
| 2011/0153102 | A1 | 6/2011 | Tyagi et al. |
| 2013/0254151 | A1* | 9/2013 | Mohagheghi et al. .......... 706/46 |

OTHER PUBLICATIONS

Kelly et al., "Report to NIST Provides Insight on Smart Grid Interoperability Standards Development", National Institute of Standards and Technology, pp. 1-16, Jun. 17, 2009.

* cited by examiner

*Primary Examiner* — Kenneth M Lo
*Assistant Examiner* — Chad Rapp
(74) *Attorney, Agent, or Firm* — Nitin K. Joshi

(57) ABSTRACT

A method includes receiving at least one event parameter for a demand response event and identifying a pool of customers. The pool of customers includes a plurality of customers potentially usable to support the demand response event. Characteristics of each customer in the pool of customers are retrieved and a plurality of groups of customers are created from the pool of customers based on the retrieved characteristics and the at least one event parameter.

19 Claims, 4 Drawing Sheets

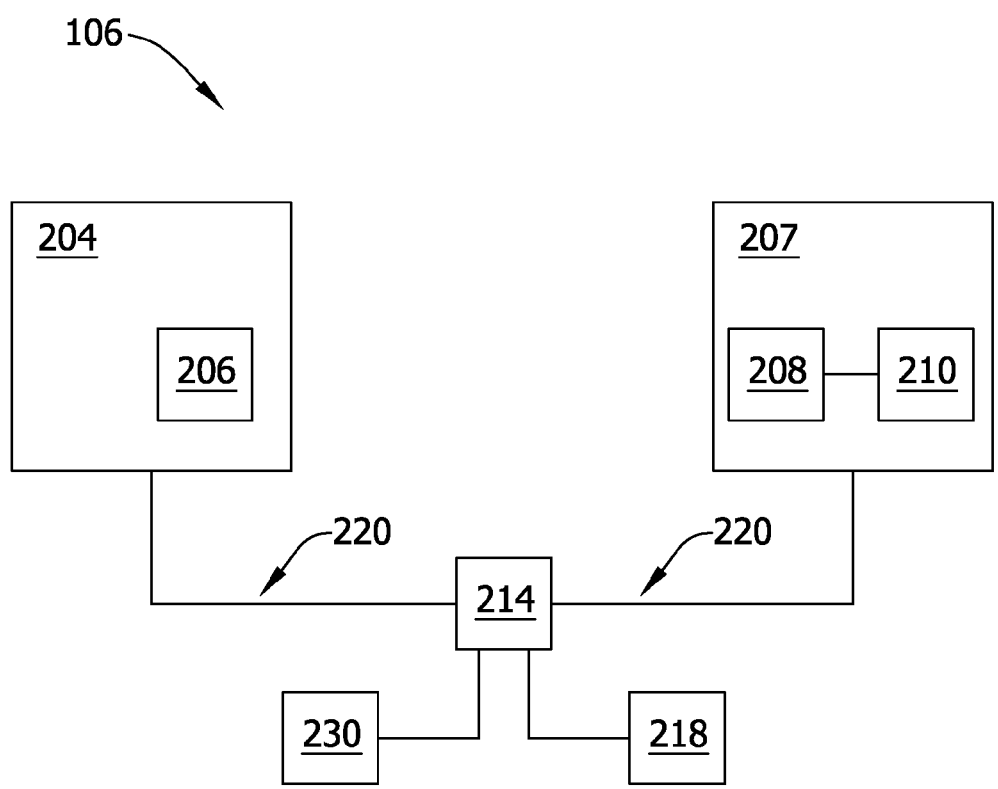

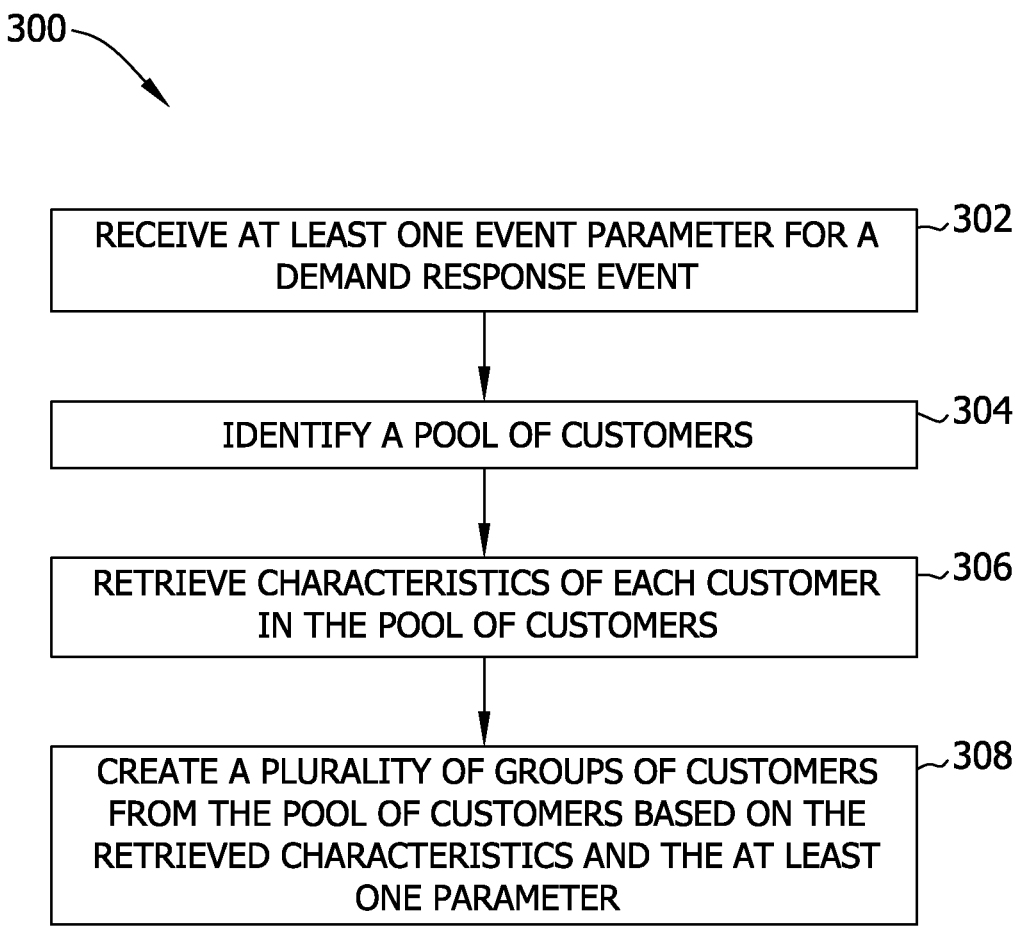

SYSTEMS AND METHODS TO AGGREGATE LOADS FOR DEMAND RESPONSE EVENTS

BACKGROUND OF THE INVENTION

The field of the invention relates generally to demand response systems and, more particularly, to a computing device for use with a demand response system that enables dynamic aggregation of resources for scheduling demand response events.

The combination of the increasing world population and the increased use of electric vehicles has created an increased electricity energy demand. Energy demand has also increased for use to power buildings, homes, and/or to charge batteries or other energy sources used in electric vehicles. The demand on the power grid has increased as the cost of fuel has increased. Such demands will likely cause an increase in the price of energy from the power grid. In particular, initially at least, the price of energy is likely to increase during peak times of high demand.

Currently, at least some known utilities use demand response systems that enable customers to enroll in at least one demand response program to manage the consumption of energy by their customers in response to supply conditions. Examples of demand response programs include a direct control program, a critical peak pricing program, and a time of use program. The initiation and/or implementation of a demand response program by a utility is known as a demand response event. A demand response event is initiated by a utility transmitting a plurality of signals to its customers. For example, a demand response event representative of a direct load control program, is initiated when the utility transmits a signal to a device within a building, such as an in-home smart device and/or smart thermostat, such that the utility is enabled to directly control the usage of energy consuming machines within the building. A demand response event representative of a critical peak pricing program occurs when the utility transmits pricing signals to its customers during peak demand times. The pricing signals enable the utility to apprise customers of heightened energy prices during peak demand time periods such that customers may limit their energy consumption during such peak demand time periods. A demand response event representative of a time of use program occurs when the utility transmits a signal to a customer that is representative of energy prices that correspond to a time range such that the customer may identify an optimal time of day and/or day of the week to consume energy to ensure a low energy price rate.

Such demand response systems enable the utility to manage peak load conditions and to reduce energy demand among their customers. However, current demand response systems typically group customers in static groups by physical location on the grid and/or by the demand reserve program in which the customers participate. Current demand response systems also transmit a large number of signals to customers during a demand response event and the signals are transmitted at the same time to all the customers. These characteristics can result in various problems, such as load spiking and phase imbalance.

BRIEF DESCRIPTION OF THE INVENTION

In one embodiment, a computing device for use with a demand response system is provided. The computing device includes a memory device for storing customer data of a plurality of customers of a utility and a processor coupled to the memory device. The processor is programmed to receive at least one event parameter for a demand response event and identify a pool of customers from the plurality of customers of the utility. The pool of customers includes a plurality of customers potentially usable to support the demand response event. The processor is programmed to retrieve characteristics of each customer in the pool of customers; and create a plurality of groups of customers from the pool of customers based on the retrieved characteristics and the at least one event parameter.

In another embodiment, a demand response system is provided. The demand response system includes a computing device. The computing device includes a memory device for storing customer data of a plurality of customers of a utility and a processor coupled to the memory device. The processor is programmed to receive at least one event parameter for a demand response event and identify a pool of customers from the plurality of customers of the utility. The pool of customers includes a plurality of customers potentially usable to support the demand response event. The processor is programmed to retrieve characteristics of each customer in the pool of customers; and create a plurality of groups of customers from the pool of customers based on the retrieved characteristics and the at least one parameter.

In yet another embodiment, a method for providing demand response events is provided. The method includes receiving at least one event parameter for a demand response event and identifying a pool of customers. The pool of customers includes a plurality of customers potentially usable to support the demand response event. The method includes retrieving characteristics of each customer in the pool of customers and creating a plurality of groups of customers from the pool of customers based on the retrieved characteristics and the at least one event parameter.

BRIEF DESCRIPTION OF THE DRAWINGS

FIG. 3 is a block diagram of an exemplary computing device that may be used with the demand response system shown in FIGS. 1 and 2; and FIG. 4 is a flow chart of an exemplary method that may be used for providing demand response events using the computing device shown in FIG. 3.

DETAILED DESCRIPTION OF THE INVENTION

The exemplary systems and methods described herein overcome at least some known disadvantages of known demand response systems by enabling a utility to selectively transmit signals representative of demand response programs to customers. More specifically, the embodiments described herein provide a computing device for use with a demand response system. The computing device includes a memory device for storing customer data of a plurality of customers of a utility and a processor coupled to said memory device. The processor is programmed to receive at least one event parameter for a demand response event, identify a pool of customers from the plurality of customers of the utility, retrieve characteristics of each customer in the pool of customers, and create a plurality of groups of customers from the pool of customers based on the retrieved characteristics and the at least one parameter. The pool of customers includes a plurality of customers potentially usable to support the demand response event. By dynamically selecting groups of customers based on retrieved characteristics of the customers and at least one event parameter, as opposed to using static groups of customers based on location or demand response program, the utility is able to target specific customers, grid locations, power consuming devices, and/or electric phases, to reduce the chances for a failure of the grid, reduce power spikes on the grid, and/or balance load distribution.

Figure 1:
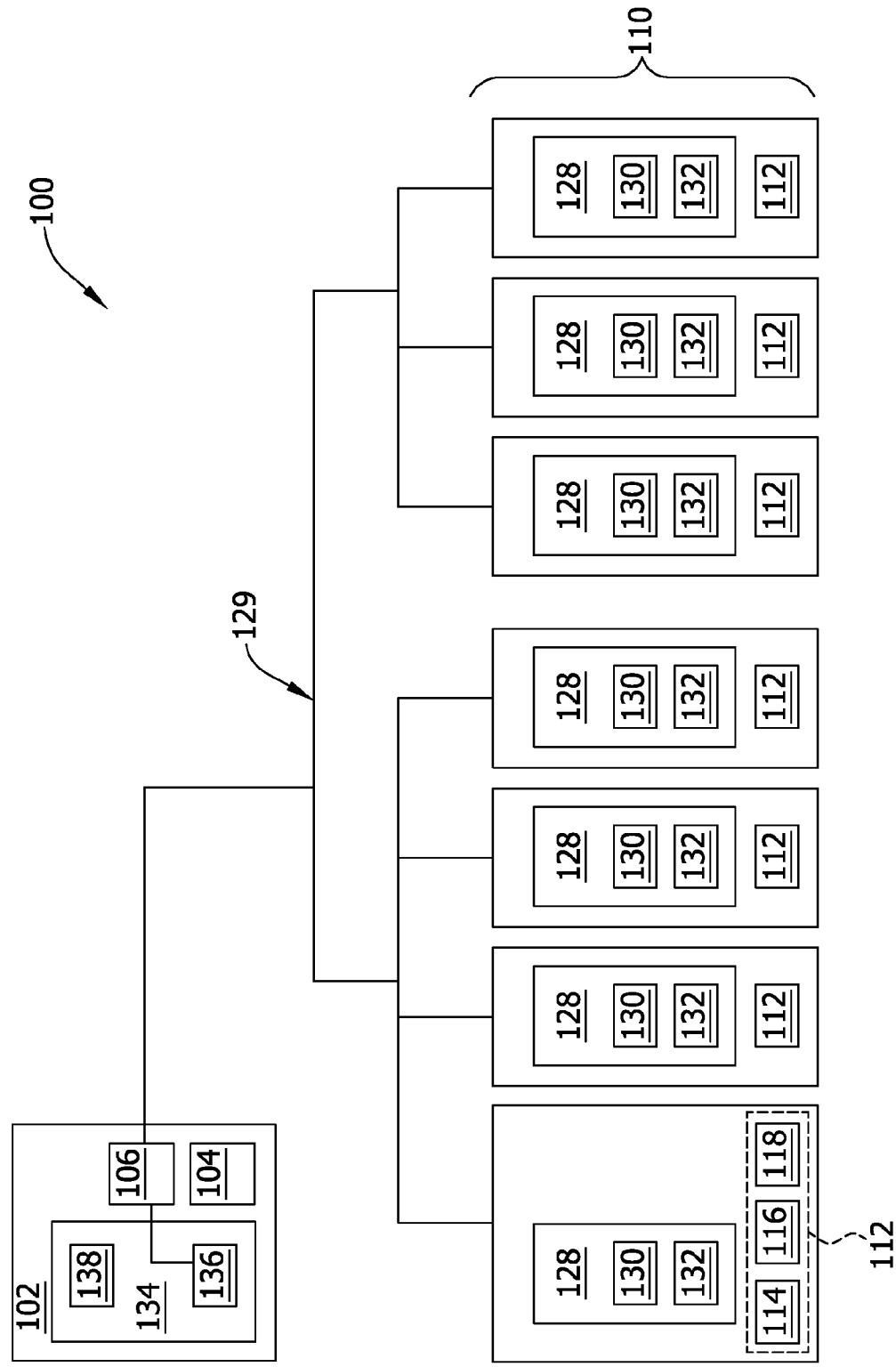
FIG. 1 is a block diagram of an exemplary demand response system.
Figure 2:
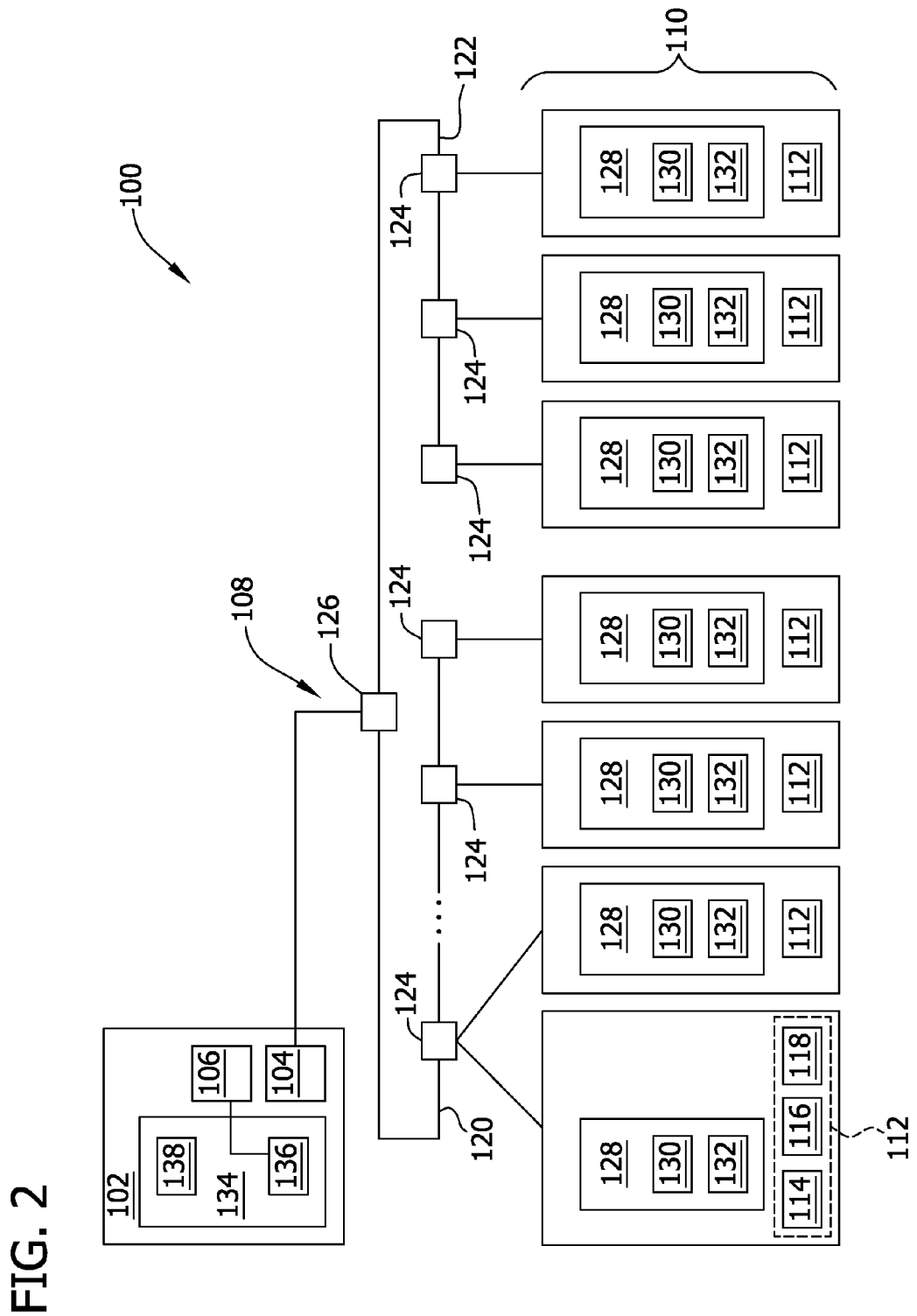
FIG. 2 is another block diagram of the demand response system shown in FIG. 1.

FIGS. 1 and 2 illustrate a demand response system 100. In the exemplary embodiment, demand response system 100 includes a utility 102. Utility 102 includes an electric power generation system 104 and a computing device 106. Computing device 106 enables utility 102 to communicate with customers and electric power generation system 104 supplies electrical power to customers via an electric network 108 (shown in FIG. 2). Electric power generation system 104 may include a generator driven by, for example, a gas turbine engine, a hydroelectric turbine, a wind turbine, one or more solar panels, and/or another suitable generation system. In other embodiments, electric power generation system 104 may be positioned at a different location from computing device 106 and/or computing device 106 may not be positioned within utility 102 and may be positioned external to utility 102.

In the exemplary embodiment, computing device 106 is communicatively coupled to a plurality of buildings 110, which may be occupied by a plurality of customers. It should be noted that, as used herein, the term "couple" is not limited to a direct mechanical, electrical, and/or communication connection between components, but may also include an indirect mechanical, electrical, and/or communication connection between multiple components.

In the exemplary embodiment, electric power generation system 104 is coupled to buildings 110 via electric network 108 to provide power to buildings 110. More specifically, each building includes one or more power consuming devices 112, which may utilize power provided by electric power generation system 104. While power consuming devices 112 may be any type of device that consumes electrical power, in the exemplary embodiment, power consuming devices 112 may include an electric water heater 114, an air conditioner 116, and/or a pool pump 118. For purposes of this embodiment, power consuming devices 112 of each illustrated building 110 include one or more of electric water heater 114, air conditioner 116, and/or pool pump 118. In some embodiments, at least one building 110 may not include any of electric water heater 114, air conditioner 116, and pool pump 118.

In the illustrated embodiment, electric network 108 includes a first lateral line 120 and a second lateral line 122. Each lateral line includes a plurality of transformers 124 (sometimes referred to as pole top transformers). At least one building 110 is coupled to electric network 108 via each transformer 124. First and second lateral lines 120 and 122 are connected at a node 126, which may be a substation, a transformer, a switch, etc. For simplicity, a single line diagram is illustrated for electric network 108. Electric network 108 may, however, include multiple wires carrying multiple phases of electric power and buildings 110 may be connected to different phases of electric power.

In the exemplary embodiment, computing device 106 is communicatively coupled to at least one user notification 128 device within each building 110 via a network 129 (shown in FIG. 1) such that computing device 106 may communicate with user notification device 128. In the exemplary embodiment, user notification device 128 may be a computer, a cellular phone, and/or a smart device, including a smart box and/or smart thermostat. Alternatively, user notification device 128 may be any other device that is configured to communicate with computing device 106. Moreover, in the exemplary embodiment, user notification device 128 includes a user interface 130 that receives at least one input from a user, such as a customer of utility 102. In other embodiments, user notification device 128 may not include user interface 130. In the exemplary embodiment, user interface 130 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Moreover, in the exemplary embodiment, user notification device 128 includes a presentation interface 132 that presents information, such as information regarding demand response programs and/or demand response events that are received from utility 102, input events and/or validation results, to the user. In the exemplary embodiment, presentation interface 132 includes a display adapter (not shown) that is coupled to at least one display device (not shown). More specifically, in the exemplary embodiment, the display device is a visual display device, such as a cathode ray tube (CRT), a liquid crystal display (LCD), an organic LED (OLED) display, and/or an "electronic ink" display. Alternatively, presentation interface 132 may include an audio output device (e.g., an audio adapter and/or a speaker) and/or a printer. In other embodiments, user notification device 128 may not include presentation interface 132.

In the exemplary embodiment, computing device 106 may communicate with user notification device 128 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. More specifically, in the exemplary embodiment, user notification device 128 is configured to receive at least one signal from computing device 106 that is representative of at least one demand response event. In the exemplary embodiment, the demand response event initiates the implementation of a demand response program that may include a direct load control program, a critical peak pricing program, and/or a time of use program.

In the exemplary embodiment, utility 102 also includes a data management system 134 that is coupled to computing device 106 via network 129. Data management system 134 may be any device capable of accessing network 129 including, without limitation, a desktop computer, a laptop computer, or other web-based connectable equipment. More specifically, in the exemplary embodiment, data management system 134 includes a database 136 that includes customer data for each of the customers of utility 102. In the exemplary embodiment, the customer data may include an enrollment period and/or an enrollment status for each customer for participating in at least one demand response program. For example, the data may include a selection made by each customer for at least one demand response program to participate in. The customer data may also include a participation history for each customer. The participation history may include, for example, the previous demand response events that each customer has participated in. The customer data may also include a geographic area of each customer, such as the geographic area where each customer resides. The customer data may include the phase of power utilized by each customer. The customer data may indicate what type of customer each customer is, such as commercial or residential. The customer data may indicate the types of power consuming devices 112 used by each customer. The types of devices may include, for example, electric water heater 114, air conditioner 116, pool pump 118, etc.

Moreover, in the exemplary embodiment, data management system 134 includes a user interface 138 that receives at least one input from a user, such as an operator and/or employee of utility 102. In the exemplary embodiment, data management system user interface 138 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Data management system 134 may communicate with computing device 106 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, cellular phone technology (e.g., the Global Standard for Mobile communication (GSM)), a satellite communication link, and/or any other suitable communication means. More specifically, in the exemplary embodiment, data management system 134 transmits the customer data to computing device 106. While the customer data is shown as being stored in database 136 within data management system 134 in the exemplary embodiment, it should be noted that the customer data may be stored in another system and/or device. For example, computing device 106 may store the customer data therein.

FIG. 3 is a block diagram of computing device 106. In the exemplary embodiment, computing device 106 includes a user interface 204 that receives at least one input from a user, such as an employee of utility 102 (shown in FIGS. 1 and 2). In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received from a user via user interface 204, and/or information received from other components of demand response system 100 (shown in FIGS. 1 and 2).

Computing device 106, in the exemplary embodiment, also includes a communication interface 230 that is coupled to processor 214 via system bus 220. Moreover, in the exemplary embodiment, communication interface 230 is communicatively coupled to user notification device 128 via network 129 (shown in FIG. 1). In the exemplary embodiment, communication interface 230 communicates with user notification device 128, and/or other components within system 100.

In operation, a user of system 100 (sometimes referred to herein as an operator) specifies one or more event parameters for a demand response event. The user may specify the event parameters via user interface 204, such as, for example, by selecting parameters displayed by presentation interface 207. The event parameters can include a phase of power, a location (e.g., a particular node, etc.), an amount of reduction needed, a length of time of a load reduction, a type of customer, one or more types of power consuming devices 112, a type of demand response program, etc. The event parameter may be a segregating parameter or a balancing parameter. Thus, for example, the event parameter may be segregation of types of power consuming device 112, types of customers, phases of power, etc. Alternatively, or additionally, the event parameter may be balancing of types of power consuming device 112, types of customers, phases of power, etc.

Computing device 106 then creates groups of customers usable to support the demand response event based, at least in part, on the event parameter. To create the groups, computing device 106 identifies the node at which the demand response event will be called. This node may be identified by the operator or determined by system computing device 106. Computing device 106 determines which resources (e.g., customers, devices, etc.) may be used to support the demand response event and creates a pool of customers including the customers potentially useable to support the demand response event. Characteristics of each customer in the pool of customers are retrieved. The characteristics may include, for example, the customer's location, the demand response programs in which the customer is enrolled, the phase of power utilized by the customer, the power consuming devices 112 used by the customer, the type of customer (e.g., residential, commercial), and any other suitable information. The characteristics may be retrieved by computing device 106 from memory device 218, database 136, from user notification device 128, etc. Computing device 106 creates groups of customers from the pool of customers based on the retrieved characteristics and the event parameters.

One or more of the created groups of customers may be used to respond to the demand response event. The computing device 106 selects one or more of the created groups and schedules the selected groups. The number of groups selected is generally determined by the reduction provided by each group. The total reduction provided by the selected groups should typically meet or exceed the desired reduction of the demand response event. The reduction may be a reduction in, for example, total power, a particular phase or phases of power, etc. After the groups have been selected and scheduled for participation in the demand response event, demand response signals are transmitted to the customers (or devices 112) in the selected groups. These demand response signals will typically specify the time, duration, action, etc. for the demand response event.

The created groups may be combined to form macrogroups, from which the computing device 106 may select and schedule macrogroups for participation in the demand response event. For example, groups may be created, as discussed above, based on an event parameter of device type. If the event parameter is, for example, type of power consuming device, each created group may include a single type of device. Macrogroups may then be created from the single device groups (sometimes referred to as microgroups). The macrogroups may be created based on one or more event parameter. For example, the macrogroups may be created to balance all of the types of power consuming devices in each group. Thus, a macrogroup may be formed by selecting one microgroup for each of the types of devices.

Groups and/or macrogroups may be created before or during the occurrence of a demand response event. Thus, in some embodiments, microgroups are created in advance of any demand response event. Such microgroups may be created for nodes at which particular demand response events are common. When a demand response event is needed, computing device 106 may quickly create macrogroups from the already created microgroups. This may permit a quicker response and may be less processor intensive than other known methods. Further, groups, whether microgroups or macrogroups, may be assigned group numbers. These group numbers may be transmitted to the members (i.e., the customers) of the groups and stored, for example, by user notification device 128. When a demand response signal is to be transmitted to the groups, a single signal, addressed to the group number, may be transmitted for each group, potentially conserving network bandwidth.

Examples of the process of creating groups will now be described with reference to FIG. 2. In the first example, the event parameter is segregation by type of power consuming device 112. The pool of potential resources are all connected to first lateral line 120. For this example, the operator specifies a group size as a particular number of power consuming devices 112. In other examples, the group size may be selected based on other parameters, such as total kWh. For the first type of device, electric water heaters 114 for example, the number of groups is determined. The total number of the electric water heaters 114 available in the poletop transformers 124 of first lateral line 120 is determined. This number is divided by the desired group size to get the number of groups that will be created. Next, the groups are created. The poletop transformers 124 are sorted by order of distance on the first lateral line 120, e.g. from left to right in FIG. 2. The first group is created by assigning the electric water heaters 114 to it in the sequence as follows: one electric water heater 114 from the furthest poletop transformer, followed by one from the nearest, then one from the second furthest, followed by one from the second nearest and continue to the middle of the poletop sequence in this manner. This continues until the group has been completed to its intended size or the sequence has been completed. If the sequence is completed without filling the group to the desired size, the process starts again at the furthest poletop transformer and continues (including repeating) until the group has been filled to the intended group size. In the process, poletop transformers 124 that do not have any additional electric water heaters 114 available are skipped. After the first group is created in this manner, the next group of electric water heaters 114 is created in the same manner, beginning with the next poletop transformer 124 in the series just completed. If the total number of electric water heaters 114 is not evenly divisible by the desired size, the last group may not reach the intended size. After this process has been completed for the devices of electric water heaters 114, the process repeats for each additional type of device, including for example air conditioners 116 and/or pool pumps 118.

In another example, the event parameter is balancing by type of power consuming device 112. Like the previous example, the pool of potential resources are all connected to first lateral line 120. The number of groups is determined by computing the total number of all power consuming devices 112 under first lateral line 120 and dividing it by the desired group size. Microgroups are then created and segregated by device type as described above to create the number of groups determined in previous steps for each device type. To create a group (or macrogroup), one microgroup from each device type is selected. This is repeated to create the remaining groups. As a result, each group/macrogroup will generally include the same number of each type of devices. There may be some variation because of unequal numbers of devices of different types, numbers of devices not evenly divisible by group size, etc.

The process in the previously described examples may be expanded. For example, the process may be performed at a feeder or substation level. In such an example, segregated groups may be created by device type for each of first lateral line 120 and second lateral line 122. These microgroups may be combined to form larger groups including a single device type balanced across first and second lateral lines 120 and 122 by alternately selecting one group from first lateral line 120 and one group from second lateral line 122. These may further be grouped into larger groups/macrogroups that are balanced by device type. Because the subgroups are balanced across the feeders, the resulting macrogroups will also be balanced across the feeders. As a result, the groups are spread generally evenly across device type and feeder.

The above described process may also be applied to multiple other event parameters. For example, groups may be created and segregated by two or more event parameters, such as by device type and phase. These groups may then be grouped into larger balanced macrogroups.

FIG. 4 is a flow chart of a method 300 that may be used for providing demand response events using a computing device, such as computing device 106 (shown in FIGS. 1-3). At least one event parameter for a demand response event is received 302. A pool of customers is identified 304. The pool of customers includes a plurality of customer potentially usable to support the demand response event. Characteristics of each customer in the pool of customers are retrieved 306. A plurality of groups of customers is created 308 from the pool of customers based on the retrieved characteristics and the at least one parameter.

As compared to known demand response systems that are used to enable utilities to manage customers and/or energy consumption by the implementation of demand response programs, the exemplary apparatus, systems, and methods described herein enable a utility to dynamically group customers for support of a demand response event. More specifically, the embodiments described herein provide a computing device for use with a demand response system. The computing device includes a memory device for storing customer data of a plurality of customers of a utility. A processor is coupled to the interface and programmed to receive at least one event parameter for a demand response event. The processor is further programmed to identify a pool of customers from the plurality of customers of the utility and retrieve characteristics of each customer in the pool of customers. The pool of customers includes a plurality of customers potentially usable to support the demand response event. The processor is further programmed to create a plurality of groups of customers from the pool of customers based on the retrieved characteristics and the at least one event parameter. By creating groups of customers based on retrieved characteristics and at least one event parameter, as opposed to employing static groups of customers based on demand response program and/or location, the utility is able to target specific customers, locations on their grid, particular power characteristics, etc. to reduce the chances for a failure of the grid, balance power usage among phases, and/or balance load distribution.

A technical effect of the systems and methods described herein includes at least one of: (a) receiving at least one event parameter for a demand response event; (b) identifying a pool of customers; (c) retrieving characteristics of each customer in the pool of customers; and (d) creating a plurality of groups of customers from the pool of customers based on the retrieved characteristics and the at least one parameter.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the system may also be used in combination with other apparatus, systems, and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving at least one event parameter for a demand response event;
   identifying a pool of customers, comprising a plurality of customers potentially usable to support the demand response event;
   retrieving characteristics of each customer in the pool of customers; and
   creating a plurality of groups of customers from the pool of customers based on the retrieved characteristics and the at least one event parameter by:
   selecting a size of the plurality of groups;
   determining a number of groups based on the size and a total number of determined type of power consuming devices of the plurality of customers; and
   assigning the determined type of power consuming devices to the plurality of groups based on a distance of the determined type of power consuming devices to respective transformers, wherein the retrieved characteristics of each customer at least comprise the determined type of power consuming devices.

2. A method in accordance with claim 1, further comprising:
   selecting at least one group of customers from the plurality of groups of customers; and
   transmitting at least one demand response signal to the customers in the selected group of customers.

3. A method in accordance with claim 1, wherein the at least one event parameter comprises at least one of a location, a cost parameter, an amount of a load reduction, a duration of a load reduction, and a phase of a load reduction.

4. A method in accordance with claim 1, further comprising:
   storing the created plurality of groups of customers; and
   creating a plurality of macro-groups, each macro-group including a plurality of groups selected from the stored plurality of groups.

5. A method in accordance with claim 4, further comprising
   selecting at least one macro-group from the plurality of macro-groups; and
   transmitting at least one demand response signal to the customers in the selected macro-group.

6. A method in accordance with claim 5, wherein said creating a plurality of groups of customers from the pool of customers based on the retrieved characteristics and the at least one parameter is performed prior to an occurrence of a demand response event, and wherein said creating a plurality of macro-groups is performed during the occurrence of the demand response event.

7. A method in accordance with claim 1, wherein the customers in the pool of customers consume a plurality of different phases of power, and wherein said creating a plurality of groups of customers from the pool of customers based on the retrieved characteristics and the at least one parameter comprises creating a plurality of groups each having about a same number of customers consuming each phase of power.

8. A method in accordance with claim 1, wherein the pool of customers comprises a plurality of different types of customer, and wherein said creating a plurality of groups of customers from the pool of customers based on the retrieved characteristics and the at least one parameter comprises creating a plurality of groups each having about a same number of each type of customer.

9. A computing device for use with a demand response system, said computing device comprising:

a memory device for storing customer data of a plurality of customers of a utility; and a processor coupled to said memory device and programmed to:

receive at least one event parameter for a demand response event;

identify a pool of customers from the plurality of customers of the utility, the pool of customers comprising a plurality of customers potentially usable to support the demand response event;

retrieve characteristics of each customer in the pool of customers; and create a plurality of groups of customers from the pool of customers based on the retrieved characteristics and the at least one parameter by:

selecting a size of the plurality of groups;

determining a number of groups based on the size and a total number of determined type of power consuming devices of the plurality of customers; and assigning the determined type of power consuming devices to the plurality of groups based on a distance of the determined type of power consuming devices to respective transformers, wherein the retrieved characteristics of each customer at least comprise the determined type of power consuming devices.

10. A computing device in accordance with claim 9, wherein the at least one event parameter includes at least one of a location, a cost parameter, an amount of a load reduction, a duration of a load reduction, and a phase of a load reduction.

11. A computing device in accordance with claim 9, wherein said processor is further programmed to:

select at least one group of customers from the plurality of groups of customers; and transmit at least one demand response signal to the customers in the selected group of customers.

12. A computing device in accordance with claim 9, wherein said processor is further programmed to:

store the created plurality of groups of customers to said memory device; and create a plurality of macro-groups, each macro-group including a plurality of groups selected from the stored plurality of groups.

13. A computing device in accordance with claim 12, wherein said processor is further programmed to:

select at least one macro-group from the plurality of macro-groups; and transmit at least one demand response signal to the customers in the selected macro-group.

14. A computing device in accordance with claim 12, wherein customers in the pool of customers consume power in a plurality of different phases, customers in the pool of customers have a plurality of different types of power consuming devices, and the pool of customers comprises a plurality of types of customer, and wherein said processor is further programmed to create the plurality of groups of customers from the pool of customers such that at least one of:

each group has about a same amount of each type of power consuming device;

each group has about a same number of customers consuming each phase of power; and each group has about a same number of each type of customer.

15. A demand response system comprising:

a computing device comprising:

a memory device for storing customer data of a plurality of customers of a utility; and a processor coupled to said memory device and programmed to:

receive at least one event parameter for a demand response event;

identify a pool of customers from the plurality of customers of the utility, the pool of customers comprising a plurality of customers potentially usable to support the demand response event;

retrieve characteristics of each customer in the pool of customers; and create a plurality of groups of customers from the pool of customers based on the retrieved characteristics and the at least one parameter by:

selecting a size of the plurality of groups;

determining a number of groups based on the size and a total number of determined type of power consuming devices of the plurality of customers; and assigning the determined type of power consuming devices to the plurality of groups based on a distance of the determined type of power consuming devices to respective transformers, wherein the retrieved characteristics of each customer at least comprise the determined type of power consuming devices.

16. A demand response system in accordance with claim 15, wherein the at least one event parameter includes at least one of a location, a cost parameter, an amount of a load reduction, a duration of a load reduction, and a phase of a load reduction.

17. A demand response system in accordance with claim 15, wherein the processor is further programmed to:

select at least one group of customers from the plurality of groups of customers; and transmit at least one demand response signal to the customers in the selected group of customers.

18. A demand response system in accordance with claim 15, wherein said processor is further programmed to:

store the created plurality of groups of customers to the memory device; and create a plurality of macro-groups, each macro-group including a plurality of groups selected from the stored plurality of groups.

19. A demand response system in accordance with claim 18, wherein the processor is further programmed to:

select at least one macro-group from the plurality of macro-groups; and transmit at least one demand response signal to the customers in the selected macro-group.

* * * * *